United States Patent
Liu et al.

(10) Patent No.: US 10,467,777 B2
(45) Date of Patent: Nov. 5, 2019

(54) TEXTURE MODELING OF IMAGE DATA

(71) Applicant: Adobe Inc., San Jose, CA (US)

(72) Inventors: Siying Liu, Urbana, IL (US); Kalyan Sunkavalli, San Jose, CA (US); Nathan A. Carr, San Jose, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 7 days.

(21) Appl. No.: 15/934,629

(22) Filed: Mar. 23, 2018

(65) Prior Publication Data

US 2018/0211415 A1 Jul. 26, 2018

Related U.S. Application Data

(63) Continuation of application No. 14/092,210, filed on Nov. 27, 2013, now abandoned.

(51) Int. Cl.
| | |
|---|---|
| *G06T 11/00* | (2006.01) |
| *G06K 9/52* | (2006.01) |
| *G06K 9/62* | (2006.01) |
| *G06T 7/49* | (2017.01) |

(52) U.S. Cl.
CPC ............. *G06T 11/001* (2013.01); *G06K 9/52* (2013.01); *G06K 9/6211* (2013.01); *G06T 7/49* (2017.01)

(58) Field of Classification Search
None
See application file for complete search history.

(56) References Cited

U.S. PATENT DOCUMENTS

| | | |
|---|---|---|
| 2014/0064630 A1 | 3/2014 | Racape et al. |
| 2015/0145862 A1 | 5/2015 | Liu et al. |

OTHER PUBLICATIONS

Hays, James, et al. "Discovering texture regularity as a higher-order correspondence problem." European Conference on Computer Vision. Springer, Berlin, Heidelberg, 2006. (Year: 2006).*
Liu, Yanxi, Wen-Chieh Lin, and James Hays. "Near-regular texture analysis and manipulation." ACM Transactions on Graphics (TOG). vol. 23. No. 3. ACM, 2004. (Year: 2004).*
Barnes, Connelly, et al. "The generalized patchmatch correspondence algorithm." European Conference on Computer Vision. Springer, Berlin, Heidelberg, 2010. (Year: 2010).*
Barnes, Connelly, et al. "PatchMatch: A randomized correspondence algorithm for structural image editing." ACM Transactions on Graphics (ToG). vol. 28. No. 3. ACM, 2009. (Year: 2009).*
"Examiner's Answer to Appeal Brief", U.S. Appl. No. 14/092,210, filed Jan. 27, 2017, 16 pages
"Final Office Action", U.S. Appl. No. 14/092,210, filed Feb. 16, 2016, 12 pages.

(Continued)

*Primary Examiner* — Vu Nguyen
(74) *Attorney, Agent, or Firm* — SBMC

(57) ABSTRACT

Texture modeling techniques for image data are described. In one or more implementations, texels in image data are discovered by one or more computing devices, each texel representing an element that repeats to form a texture pattern in the image data. Regularity of the texels in the image data is modeled by the one or more computing devices to define translations and at least one other transformation of texels in relation to each other.

20 Claims, 13 Drawing Sheets

(56) References Cited

OTHER PUBLICATIONS

"Non-Final Office Action", U.S. Appl. No. 14/092,210, filed Jul. 8, 2015, 10 pages.
"PTAB Decision", U.S. Appl. No. 14/092,210, filed Jan. 24, 2018, 12 pages.
"Scale Invariant Feature Transform", Retrieved from <https://www.scholarpedia.org/w/index.php?title=Scale_Invariant_Feature_Transform&oldid=136886>, Oct. 11, 2013, 16 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Barnes,"The Generalized PatchMatch Correspondence Algorithm", European Conference on Computer Vision—Retrieved from <http://gfx.cs.princeton.edu/pubs/Barnes_2010_TGP/generalized_pm.pdf> on Sep. 9, 2010, Sep. 2010, 14 pages.
Darabi,"Image Melding: Combining inconsistent images using patch-based synthesis", ACM Transactions on Graphics (TOG) (Proceedings of SIGGRAPH 2012), 31(4):82:1-82:10, 2012., Jul. 2012, 10 pages.
Shi,"Normalized Cuts and Image Segmentation", IEEE Transactions on Pattern Analysis and Machine Intelligence, vol. 22, No. 8, Aug. 2000, Aug. 2000, pp. 888-905.

\* cited by examiner

300

800

(a) (b)

TEXTURE MODELING OF IMAGE DATA

RELATED APPLICATION

This application is a continuation of and claims priority to U.S. patent application Ser. No. 14/092,210, filed Nov. 27, 2013, entitled "Texture Modeling of Image Data", the entire disclosure of which is hereby incorporated by reference herein in its entirety.

BACKGROUND

Image processing may be performed to support a variety of different functionality. One example of such functionality is texture modeling, which may be utilized to locate patterns of texture in image data. For example, an image of a brick wall may contain repeating patterns of bricks, an image of a modern skyscraper may include repeating patterns of windows, and so on. A model may thus be generated to describe these patterns of texture within the image.

Conventional techniques to perform texture modeling, however, could fail in certain instances. Such instances include perspective distortion, rotation, skewing, resizing, and so forth. For example, an image of the brick wall may be taken at an angle such that the bricks in the wall get progressively smaller in the image. Further, multiple brick walls may be contained in the image, each aligned along a different plane. Conventional techniques used to model such instances could fail to address these differences and thus a model using these conventional techniques could fail for its intended purpose.

SUMMARY

Texture modeling techniques for image data are described. In one or more implementations, texels in image data are discovered by one or more computing devices, each texel representing an element that repeats to form a texture pattern in the image data. Regularity of the texels in the image data is modeled by the one or more computing devices to define translations and at least one other transformation of texels in relation to each other.

In one or more implementations, a patch matching technique is utilized to locate self-similar patterns of patches including scales, rotations, skews, or perspective distortions within image data. A model is generated by fitting a lattice to the located self-similar patterns.

In one or more implementations, a system includes a texture pattern discovery model and a model generation module. The texture pattern discovery module is implemented at least partially in hardware and configured to discover texels in image data, each texel representing an element that repeats to form a texture pattern in the image data. The model generation module is also implemented at least partially in hardware and configured to generate a model describing regularity of the texels in the image data to define translations and at least one other transformation of texels in relation to each other.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Texture modeling may be used to support a variety of different image processing techniques, such as to manipulate texture of the image. For example, windows in an image of a skyscraper may be replaced with modern versions of the windows, and so on. Conventional techniques that were utilized to perform such modeling, however, could fail when transformations are involved, such as to match a perceptively distorted texture with the same texture at a different part of the image that is not distorted.

Texture modeling techniques are described in the following. For example, texture modeling may be performed for a single image. To discover self-similar patterns within the image, a patch matching technique may be enhanced to find k-nearest neighbor (k-NN) patches across scales (e.g., resizing), rotations, skews, and perspective distortions. An example of a patch matching technique is described as *The Generalized PatchMatch Correspondence Algorithm*, by C. Barnes, E. Shechtman, A. Finkelstein, and D. B. Goldman, In European Conference on Computer Vision, September 2010, the disclosure of which is hereby incorporated by reference in its entirety. Various other techniques are described that involve the discovery of a texel, which is a canonical texture element that repeats to form the texture image. Model generation is then described, which may include fitting a lattice to the texels, which may be performed to address perspective distortion and other transforms of the texels in relation to each other.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
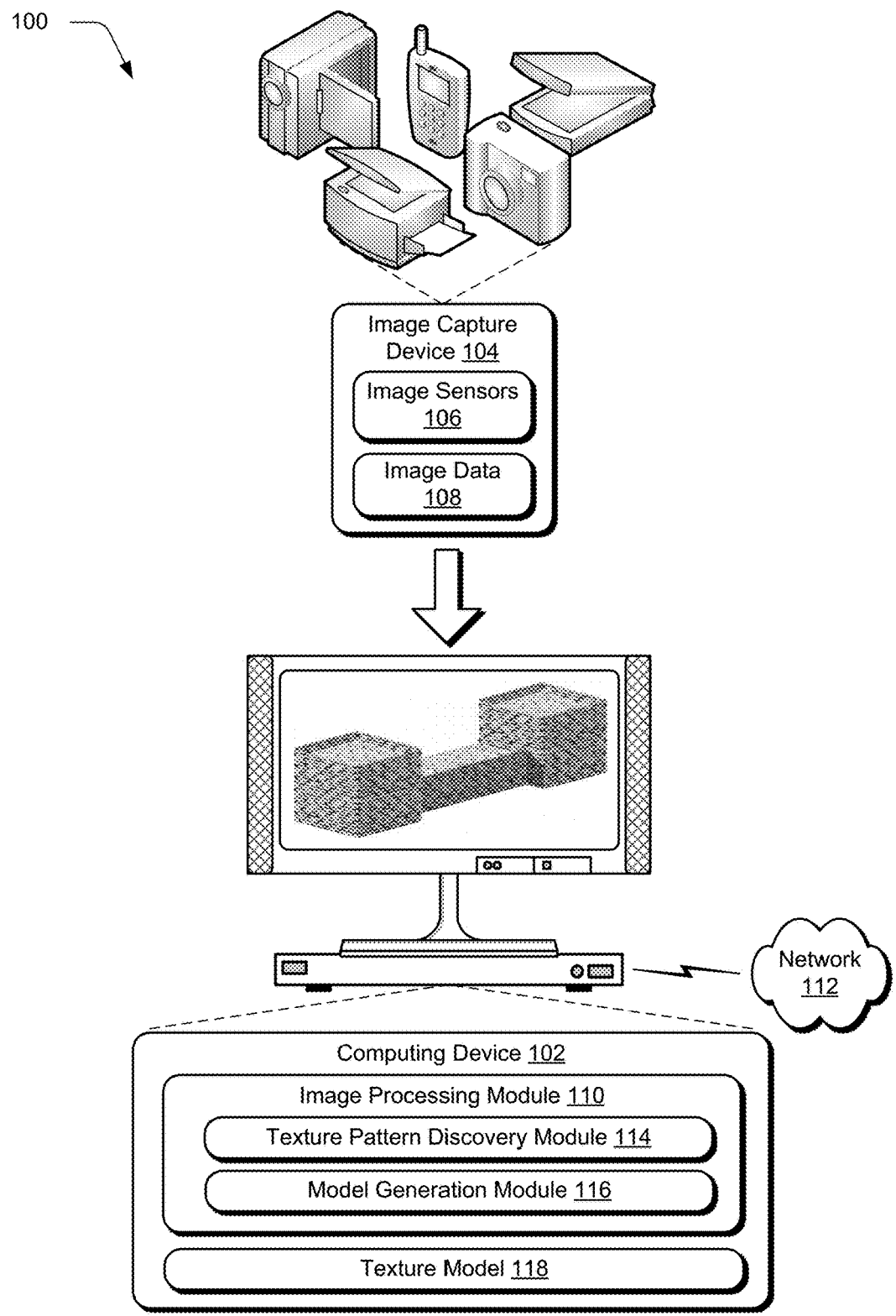
FIG. 1 is an illustration of an environment in an example implementation that is operable to employ texture modeling techniques described herein.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 13.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 that are configured to capture and generate image data 108. For example, the image sensors 106 may be configured to capture images using a Bayer pattern, in a raw format, and so on. The image data 108 may also be partially processed, e.g., by an image data pipeline using a variety of different operations as part of default processing. Examples of these operations include interpolation of the image data in the raw format (e.g., a Bayer pattern) into a red, green, and blue image format, de-mosaicking, gamma correction, sharpening, de-noising, and so on. Thus, the image data 108 may take a variety of different forms.

The computing device 102 is illustrated as including an image processing module 110. The image processing module 110 is representative of functionality of the computing device 102 to process an image. Although illustrated as implemented locally at the computing device 102, this functionality may be implemented in a variety of ways, such as remotely over a network 112 as part of a web service, distributed between the computing device 102 and a web service (e.g., by obtaining a locally executable runtime module for execution in a browser or web application process), and so on.

An example of image processing that may be performed by the image processing module 110 is represented as a texture pattern discovery module 114 and a model generation module 116. The texture pattern discover module 114 is representative of functionality to discover patterns of texture in image data 108, such as the brick walls illustrated in a user interface of the computing device 102. The model generation module 116 is representative of functionality to form a texture module 118 from the discovered patterns and thus may model how the texture patterns are disposed within the image data 108, which may include transforms of the pattern.

For example, the texture pattern discovery module 114 may be configured to discover texels, which are the canonical texture elements that recur spatially in the image data 108. The model generation module 116 may then model regularities of texels in the image data 108 to form a texture model 118 that describes a spatial configuration of texels that form a texture pattern.

The texture pattern discovery module 114 and model generation module 116, for instance, may form a texture modeling pipeline. Given image data 108 of a single image, for example, texels (e.g., repeated elements) are discovered by finding self-similar patterns in the image data 108. The model generation module 106 may then model regularity of the self-similar patterns, which may be performed by fitting a lattice to describe spatial tiling of the texels by finding how corresponding texels are arranged spatially. With the lattice fitted, a texture image may be synthesized to verify correctness of the texture model 118, which may serve as a basis to refine the texture model 118. In the following discussion, a single texture is addressed in the image. In the case of multiple textures, a segmentation mask may be utilized to locate a texture of interest.

Self-Similarity Discovery

The texture pattern discovery module 114 may find self-similar patterns in the image data 108 to discover texels. Conventional techniques typically made use of scale invariant features such as Maximally Stable Extremal Region (MSER) to detect similar feature points in an image. However, this conventional technique solely returns sparse features, some of which may not be detectable due to geometric or photometric deformations. Accordingly, a patch matching technique may be employed by the texture pattern discovery module 114 to allow explicit modeling of the relative transformation between patches in the image data 108. The patch matching techniques, for instance, may support a search for "k" nearest neighbors with extensions to address rotations, scales, and other transforms such as homographies.

The patch matching technique may be configured to find a nearest neighbor field (NNF) for every "p×p" patch (or other shape of patch) in image "A," e.g., to corresponding patches in another image "B." An NNF may be expressed as a function "$f: \mathbb{R}^2 \rightarrow \mathbb{R}^4$," defined over all possible patch coordinates (locations of patch centers) in image "A," for some distance function "D" (e.g., sum-squared-difference) between two patches. Accordingly, the patch matching technique maps a patch "a∈A" with coordinate (x, y) to a patch "bΣB" with parameters "(x', y', θ, s)," where "θ" represents the rotation angle from the upward direction and "s" represents the scaling factor.

Figure 2:
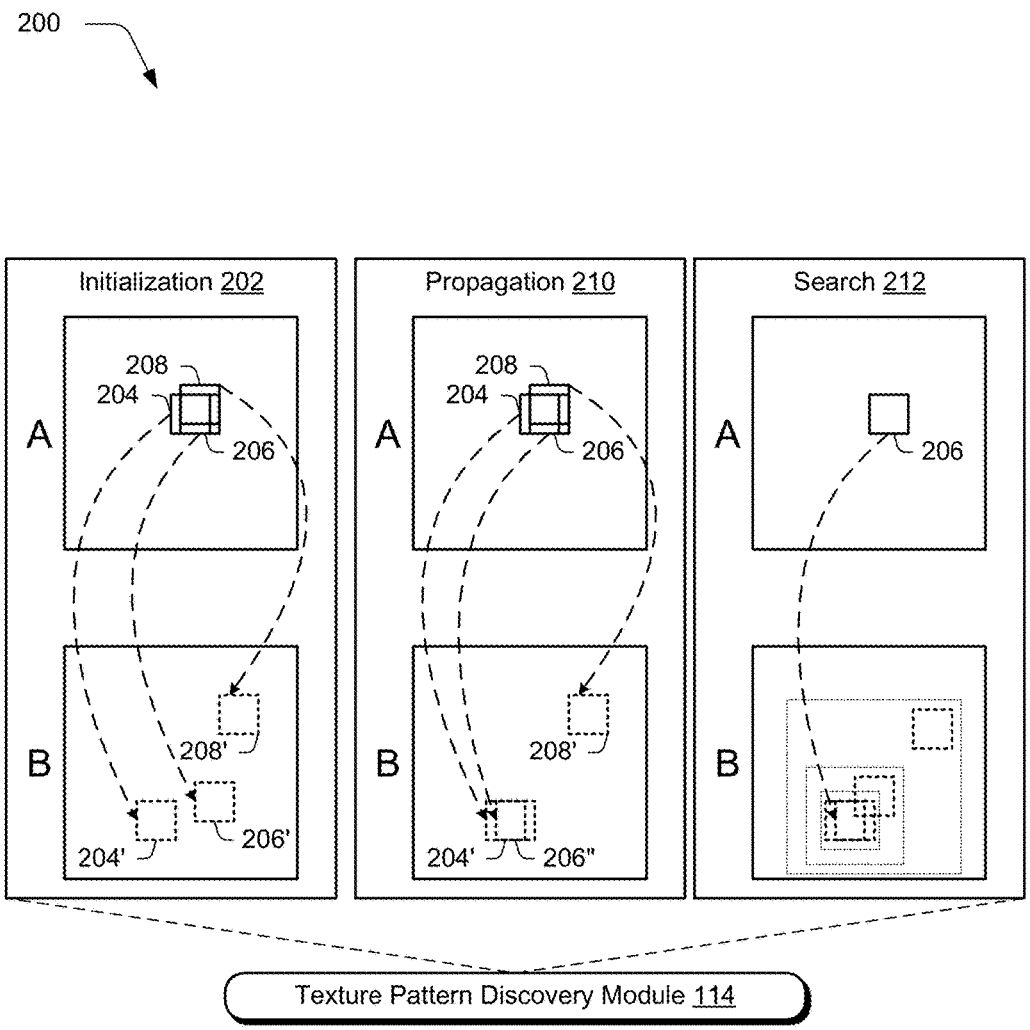
FIG. 2 depicts an example implementation showing three components of a patch matching technique.

The patch matching technique may employ three components as illustrated in the example implementation 200 in FIG. 2. Initially, the nearest-neighbor field is initialized at the initialization 202 phase with random correspondence coordinates, rotation and scale. For example, patches 204, 206, 208 are assigned random correspondence coordinates 204', 206', 208'.

The propagation phase 210 is configured to attempt to improve a nearest neighbor "$f(x)$" using the known nearest neighbors, e.g., above or to the left, an example of which is shown as a patch at 206". Let "$T(f(x))$" be the full transformation defined by "(x, y, θ, s)," the relative offsets are then transformed by a Jacobian. The new candidates for "$f(x)$" are thus "$f(x-\Delta_p)+T'(f(x-\Delta_p))\Delta_p$," where "$\Delta_p$" takes on the values of (1, 0) and (0, 1). In the random search 212 phase, the patch matching technique is employed to randomly search for better NNF candidates in concentric neighborhoods (with decreasing areas) around the currently found patch as shown in the figure.

Thus, in the initialization 202 phase patches are given random assignments. At the propagation 210 phase, a check is made the see if neighboring patching improve the mapping of the patch, thereby propagating good matches. At the search 212 phase, a random search is performed for improvement in concentric neighborhoods.

The search for "k" nearest neighbors may be extended by duplicating the single-neighbor patch matching technique "k" times. Each pixel location is associated with "k" randomized nearest neighbor candidates with a check performed such that duplicates are not encountered.

During the propagation 210 phase, the "k" adjacent patches are examined one by one and a list is maintained by the texture pattern discovery module 114 to prevent collision. If the adjacent patch offers a matching cost better than the worst distance and is not in the list, this is propagated from the adjacent patch and inserted into the list. After looping through this technique "k" times, the list is sorted by the texture pattern discovery module 114 and the "k" best candidates are kept.

The random search 212 phase operates in a similar way. Each of the "k" nearest neighbors are refined individually and appended to the list if a better solution is found without collision. Lastly, the "k" best neighbors are kept while the worse ones are removed.

Figure 3:
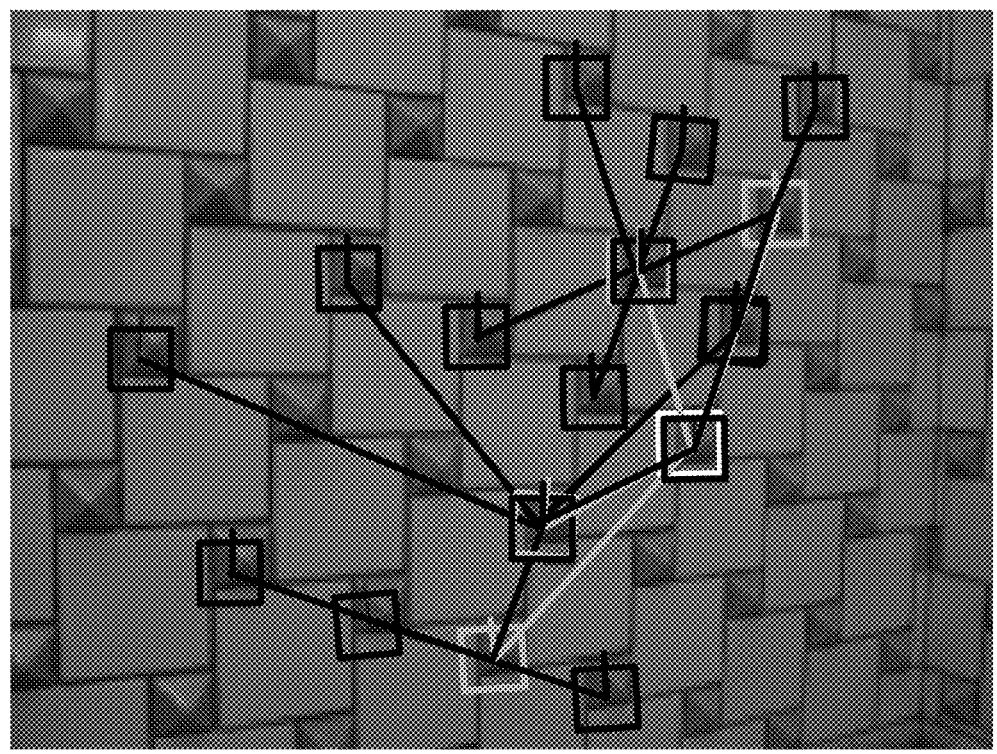
FIG. 3 depicts an example implementation showing results of a k-NN search.

FIG. 3 depicts an example implementation 300 showing results of a k-NN search, where the white box marks the query patch and the gray ones mark the k-NNs. Using the found neighbors as queries, the third generation nearest neighbors may be found, which are the decedents of the gray ones and are marked by black boxes. The "$n^{th}$" generation nearest neighbors may be recursively retrieved.

Figure 4:
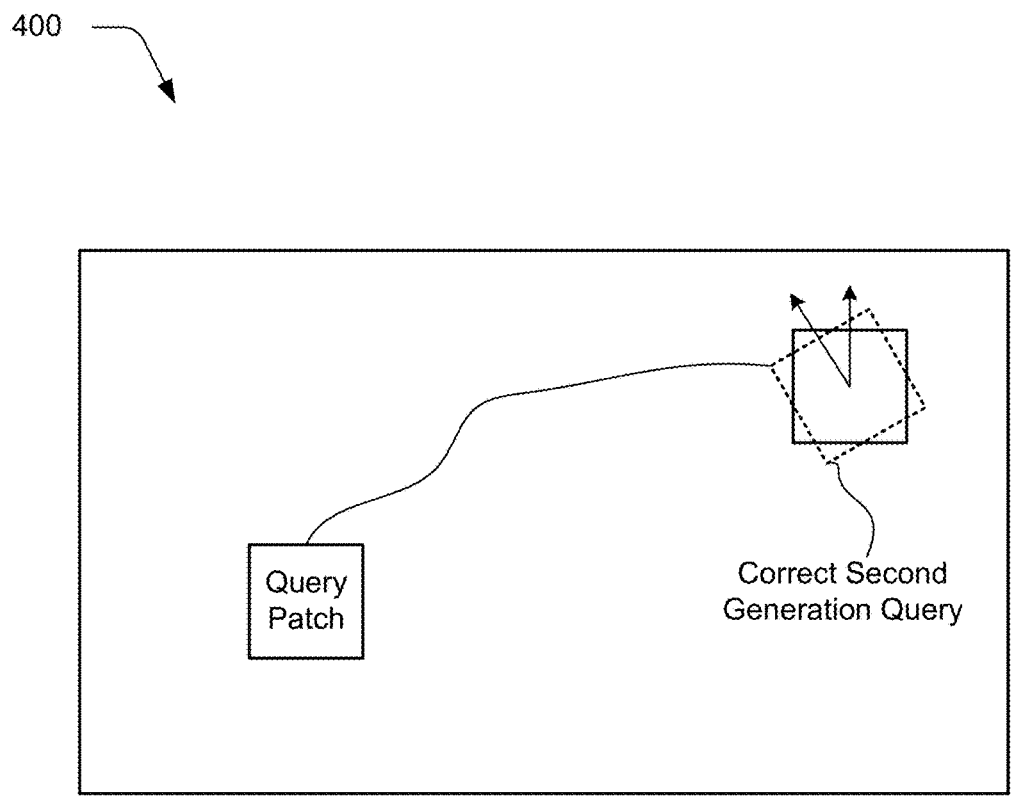
FIG. 4 depicts a correct query for the second generation k-NN search along with upright patches that are used as a query in the multi-generation k-NN retrieval.

The orientation of the patches are indicated in FIG. 3 by a line emanating from the patch centers. Note that if the second generation k-NN is rotated, the results for further generation k-NNs are approximated and the error may be carried forward, since the nearest neighbors are queried with an upright patch in the patch matching technique, an example 400 of which is shown in FIG. 4. As illustrated, the correct query for the second generation k-NN search should be the one in dotted line, however upright patches were used as a query in the multi-generation k-NN retrieval in this example.

Rotation angles may be added between descendent generations to approximate the orientation with respect to the first generation query patch. The scaling factor across multiple generations may be handled in a similar way to have the scales assigned relative to the first generation.

Modeling Regularity

As previously described, the model generation module 116 is representative of functionality to model regularity of repeating texels found using the texture pattern discovery module 114 above. The texture model 118 may be formed in a variety of ways, an example of which is described that involves lattice fitting.

In the following example, an assumption is made that the texture images fall under the wallpaper category. According to group theory of wallpaper patterns, each translational symmetric pattern may be represented by a pair of shortest translation vectors "$t_1$" and "$t_2$." For the case of pure translational symmetry, the problem can be solved by voting for the best pair of translational vectors given the dense correspondence field generated by the patch matching technique above. The "k-NNs" at the patch centered at each pixel location are retrieved and the translation vectors are accumulated in a two dimensional array. An example of voting in this translation space is illustrated in the example implementation 500 shown in FIG. 5. Translation vectors with 95 percentile (i.e., peaks in the translation space with 95 percent) are marked in gray.

In this example, the 95 percentile most frequently occurring translation vectors that are not co-linear are taken and vectors that are scaling multiples of their shortest versions are rejected. These vectors are paired up and pairs are also rejected that subtend an angle less than 40 degrees.

Following the each pair of $\{t_1, t_2\}$ hypothesis, three points "$\{(0,0), (t_{1x}, t_{1y}), (t_{2x}, t_{2y})\}$" are obtained and the affine transformation is computed to map these points to regular lattice coordinate "$\{(0, 0), (0, 1), (1, 0)\}$." These three points form the vertices of a parallelogram.

Each of the remaining patch centers voting for the two translation vectors may then be transformed into their equivalent lattice positions using the same affine transformation, and are counted as inlier points whose lattice coordinates are within some threshold "t" of an integer position "(x, y)." The translation vector pair that gives the highest inlier count is used as basis vectors for lattice generation.

Figure 6:
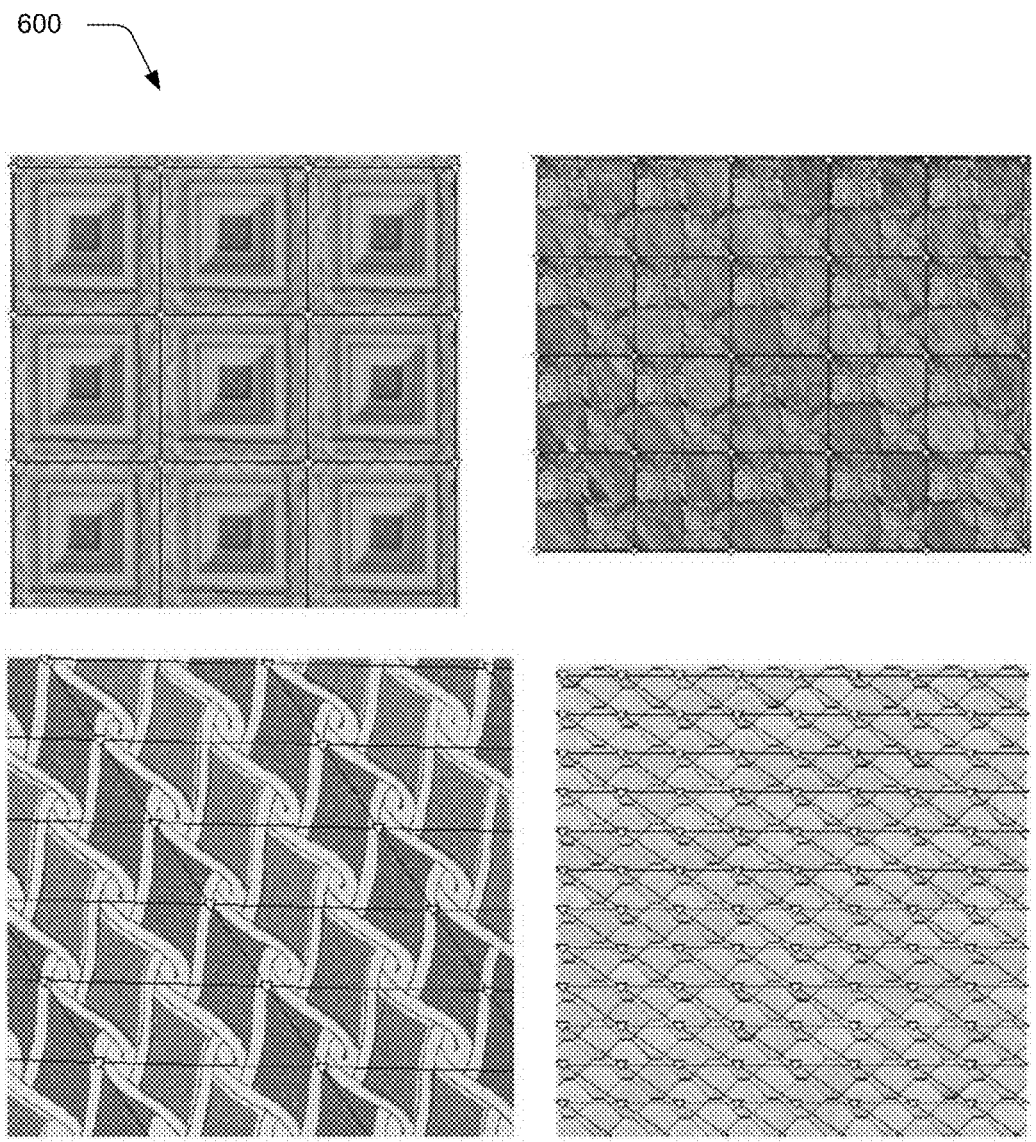
FIG. 6 illustrated examples of results of lattice fitting for various texture images with pure translation symmetries.

For lattice drawing, a patch center is selected that gives the highest entropy as the starting point and the lattice cells are formed using the found "$\{t_1, t_2\}$" translation vector pair. Examples of results of the lattice fitting for various texture images with pure translation symmetries are shown in the example implementation 600 of FIG. 6.

Figure 5:
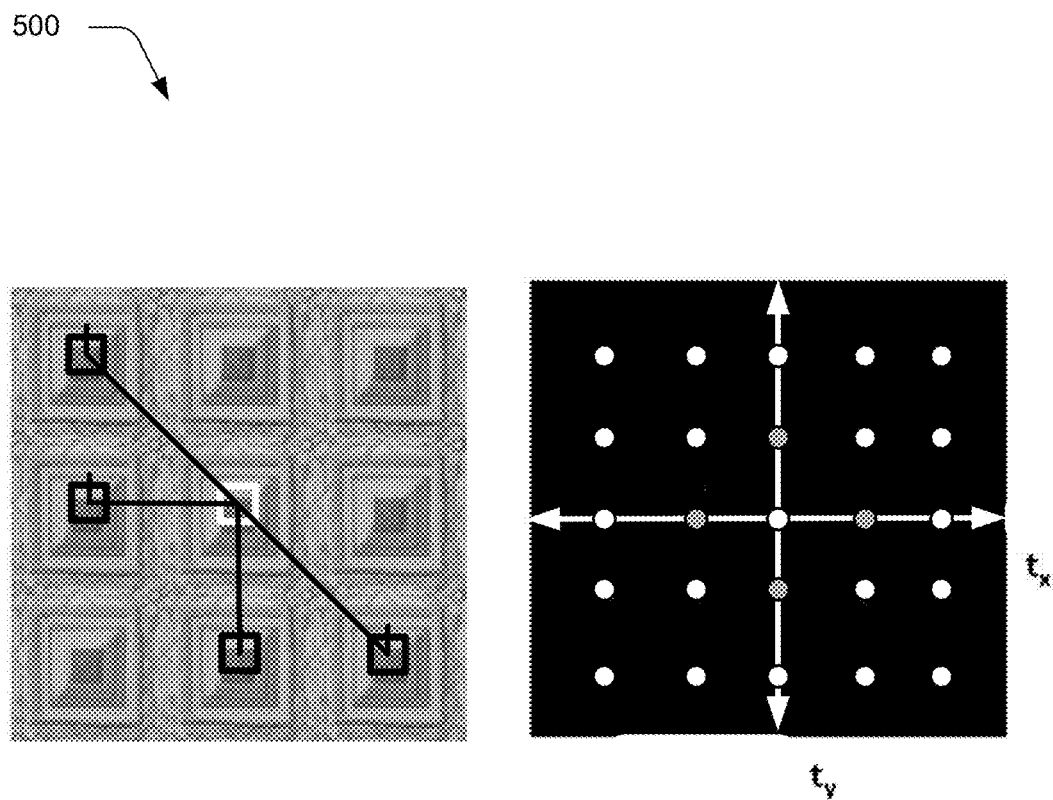
FIG. 5 depicts an example of voting in a translation space.
Figure 7:
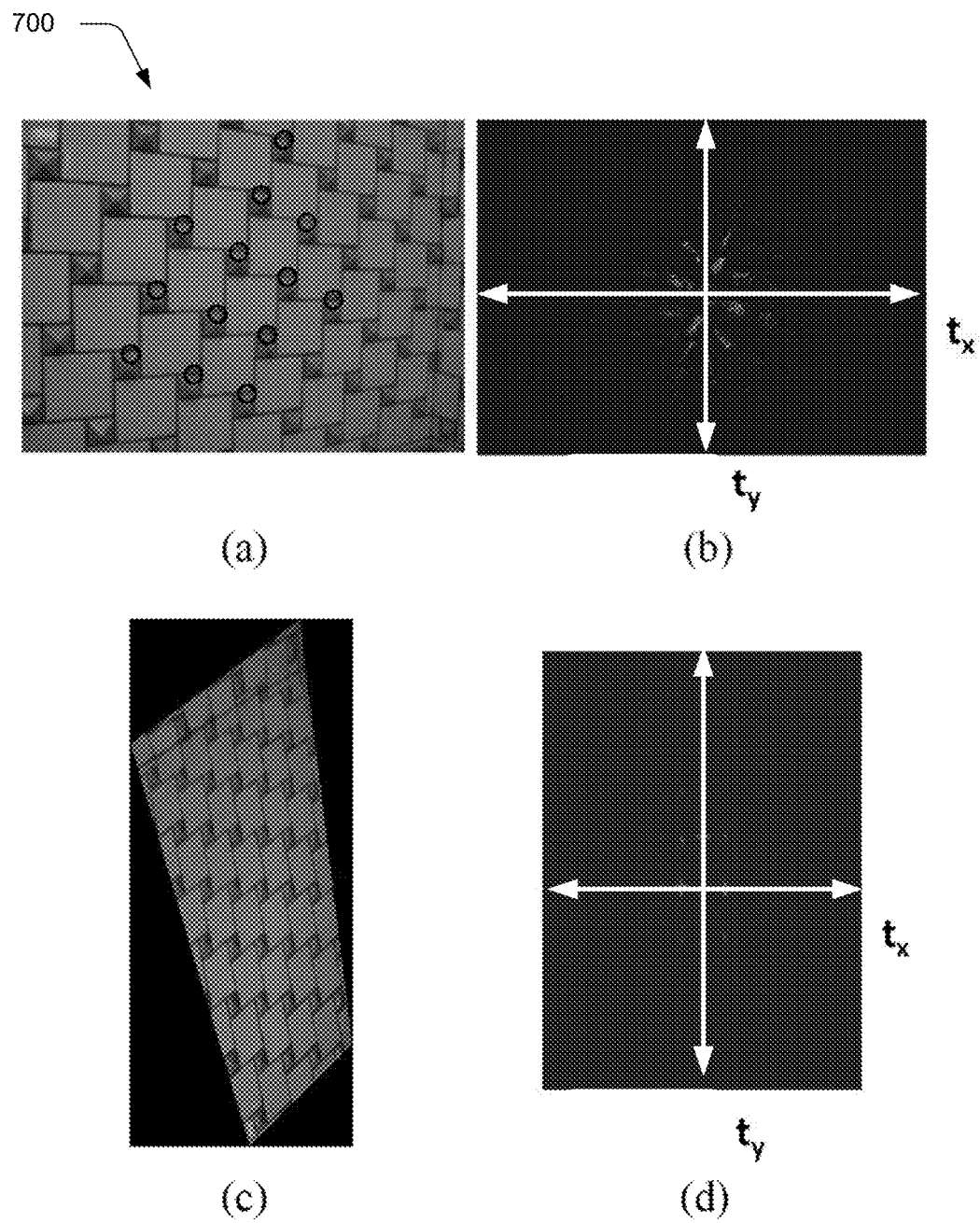
FIG. 7 illustrates an example of perspective distortions.

In many practical situations, however, the texture images may not be front-to-parallel. The translation between texels suffer from perspective distortions, an example implementation 700 of which is shown in FIG. 7. In this figure, voting of a translation vector for a slanted tiled wall is depicted. As is readily observed, the regular intervals between translation vector peaks as seen in FIG. 5 no longer hold. Instead, the peaks become more diffused due to scaling effects induced by change in depth. An affine transformation is thus insufficient to model the translation between texels.

To handle such perspective effects, the model generation module 116 of FIG. 1 may be configured to rectify the image to front-to-parallel view by estimating a homography between the slanted plane and the frontal one. The feature points for the homography fitting may be selected by randomly querying a patch's k-NN up to the third generation, as illustrated in part (a) of FIG. 7.

Four points that form the vertices of a quadrilateral are then randomly drawn. The quadrilateral checking is based on the variance of distances from each vertex to the centroid of the four points. After short-listing potential four-point candidates, each subset of points is reordered so that the candidates trace out the vertices of a quadrilateral without diagonal links. This is done by finding the convex hull of the points.

A homography is then computed between these points to the vertices of a square "$\{(0, 0), (0, d), (d, d), (d; 0)\}$," where "d" may be some arbitrary length, e.g., "d=100." A random sample consensus (RANSAC) algorithm may then be employed to find the homography "H" that gives rise to the least outliers. The rectification result and its corresponding voting in translation space are shown in parts (c) and (d) in FIG. 7. As may be observed from the figure, peaks in translation space become more focused after rectification.

Figure 8:
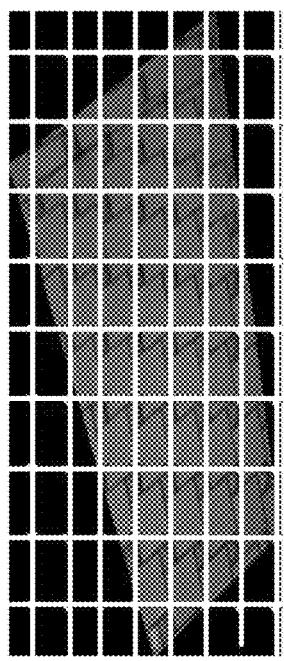
FIGS. 8 and 9 depict example implementations showing the lattice fitting results on both original and rectified views.
Figure 8:
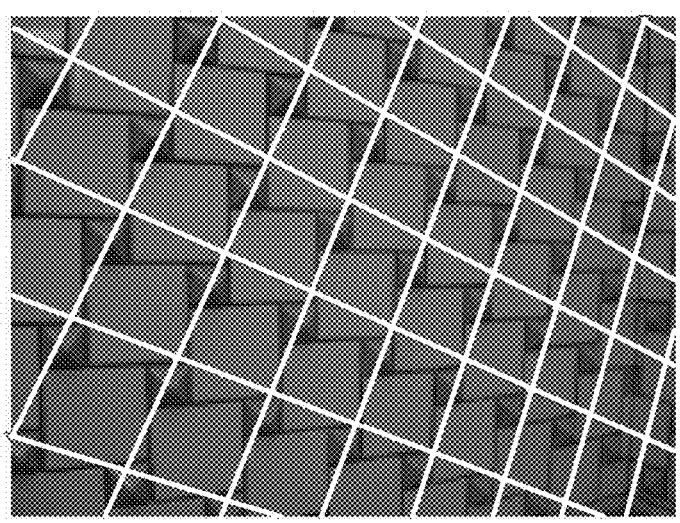
Figure 9:
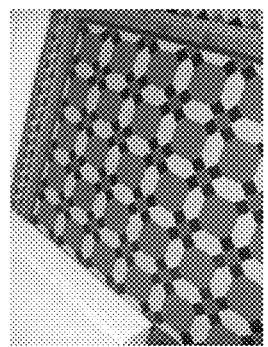
Figure 9:
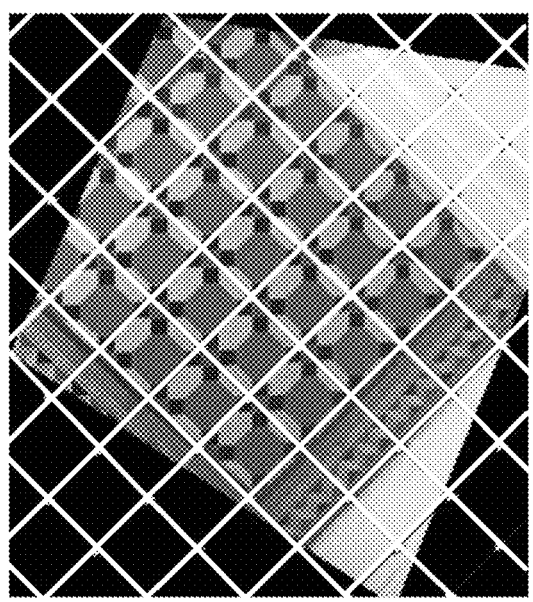
Figure 9:
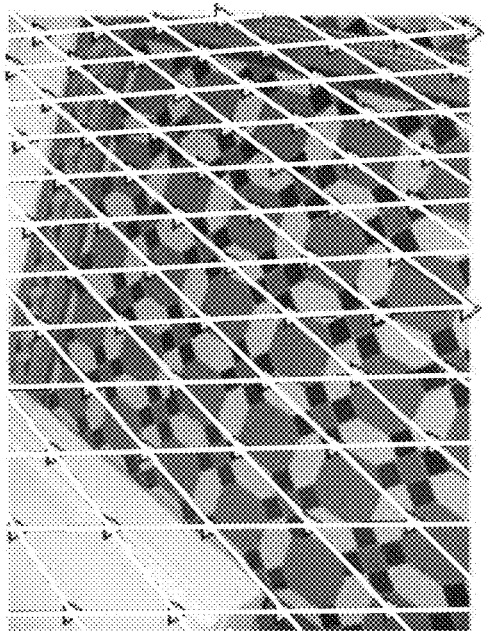

The lattice fitting procedure may then be performed as per the case of pure translational symmetry and with the lattice being warped back to the original view using the inverse of "H." FIGS. 8 and 9 depict example implementations 800, 900 showing the lattice fitting results on both original and rectified views. For example, part (a) of FIG. 8 depicts lattice fitting on a rectified image and part (b) shows a warped lattice as an overlay in relation to an original view. Part (a) of FIG. 9 depicts an input image, part (b) depicts lattice fitting on a rectified image, and part (c) depicts a warped lattice as an overlay on an original view.

While the fitting on rectified view looks fairly accurate in this example, there are drifts on the lattice points when warped back to the original viewpoint. This may be due to the low resolution at places with greater depth which causes error in homography fitting. It may also be due to the radial distortion of the camera lens. These errors may be corrected by re-localizing the lattice points based on image intensity.

A variety of different image processing techniques may leverage use of a texture model 118. For example, lattice fitting reveals how the textels are repeated, allowing image editing to be performed on the texel level for texture manipulation. An example of texture editing is illustrated in the example implementation 1000 shown in FIG. 10, where the windows of the building in part (a) are replaced by new ones in part (b) through replacement of texels.

Automatic texel discovery performed by the texture pattern discovery module 114 may also be performed using a graph-theoretic approach. Since the patch matching technique returns dense k-NN links for patches centered at each pixel of the image, a graph representation may be built that encodes such self-similarity information. Accordingly, automatic discovery of the texel translates to finding a largest sub-graph that does not contain repeating elements. In contrast to a segmentation problem which seeks to group similar pixels together, this problem involves grouping of dissimilar pixels and leads to a re-definition of similarity measure. The edge weights of the graph may be modified as follows. First, each of the k-NN linkages are set to have zero edge weights. Second, for each pixel in the image, the 4-connectivity neighbors are assigned a fixed edge weight to encourage contiguous pixels to stay together. A normalized-cut is then performed based on the modified edge weights.

Although a wallpaper assumption was described, a generalized framework may also be employed to address cases such as wobbled texture surfaces. For example, the continuity in transformations may be exploited to globally solve for the lattice using techniques such as Markov Random Field.

Example Procedures

The following discussion describes texture modeling techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
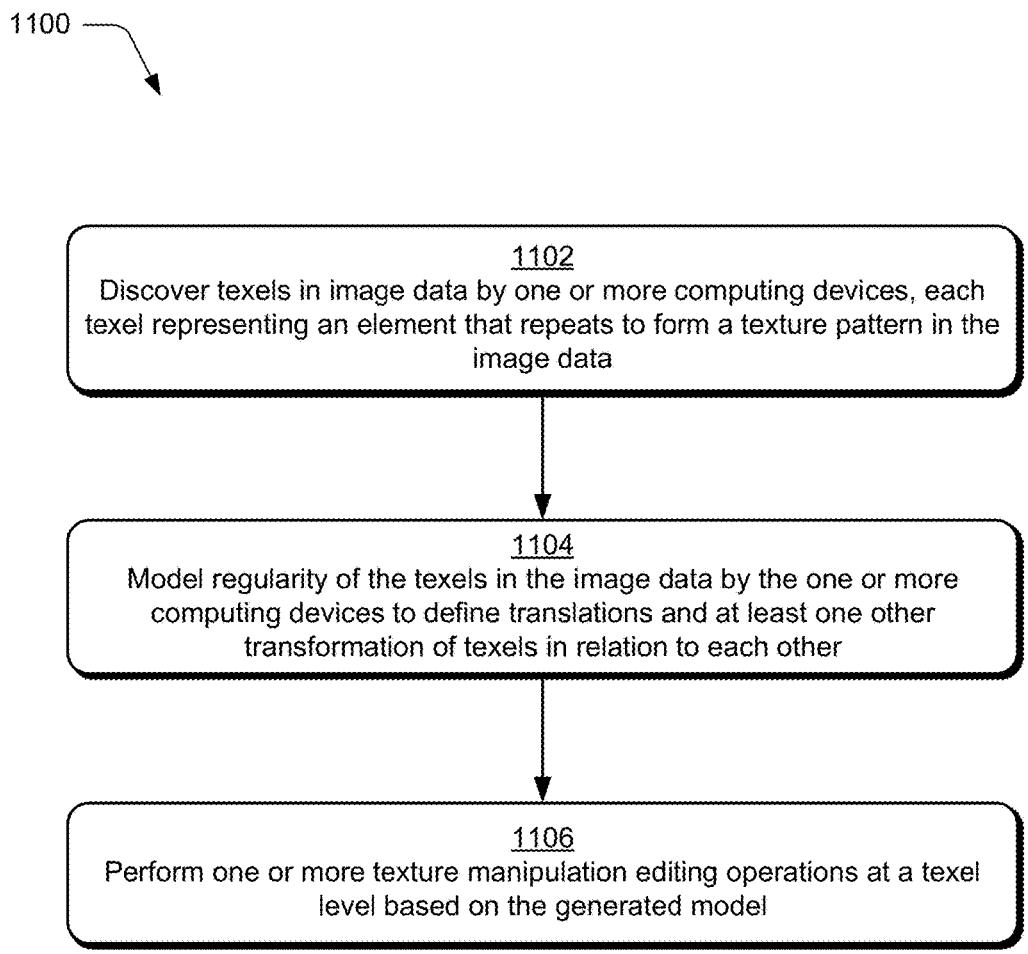
FIG. 11 is a flow diagram depicting a procedure in an example implementation in which texels are discovered and used to generate a texture model.

FIG. 11 depicts a procedure 1100 in an example implementation in which texels are discovered and used to generate a texture model. Texels in image data are discovered by one or more computing devices, each texel representing an element that repeats to form a texture pattern in the image data (block 1102). This discovery may be performed in a variety of different ways, such as by finding self-similar patterns, utilizing a patching matching technique that includes finding a nearest neighbor field (NNF) for patches, and so on.

Regularity of the texels in the image data is modeled by the one or more computing devices to define translations and at least one other transformation of texels in relation to each other (block 1104). The regularity may be modeled by fitting a lattice to texels that have been identified as having the elements that repeat to form the texture pattern. The regularity may also be modeled, for instance, to address scaling, skewing, rotation, or perspective distortion of patches having matching textures.

Figure 10:
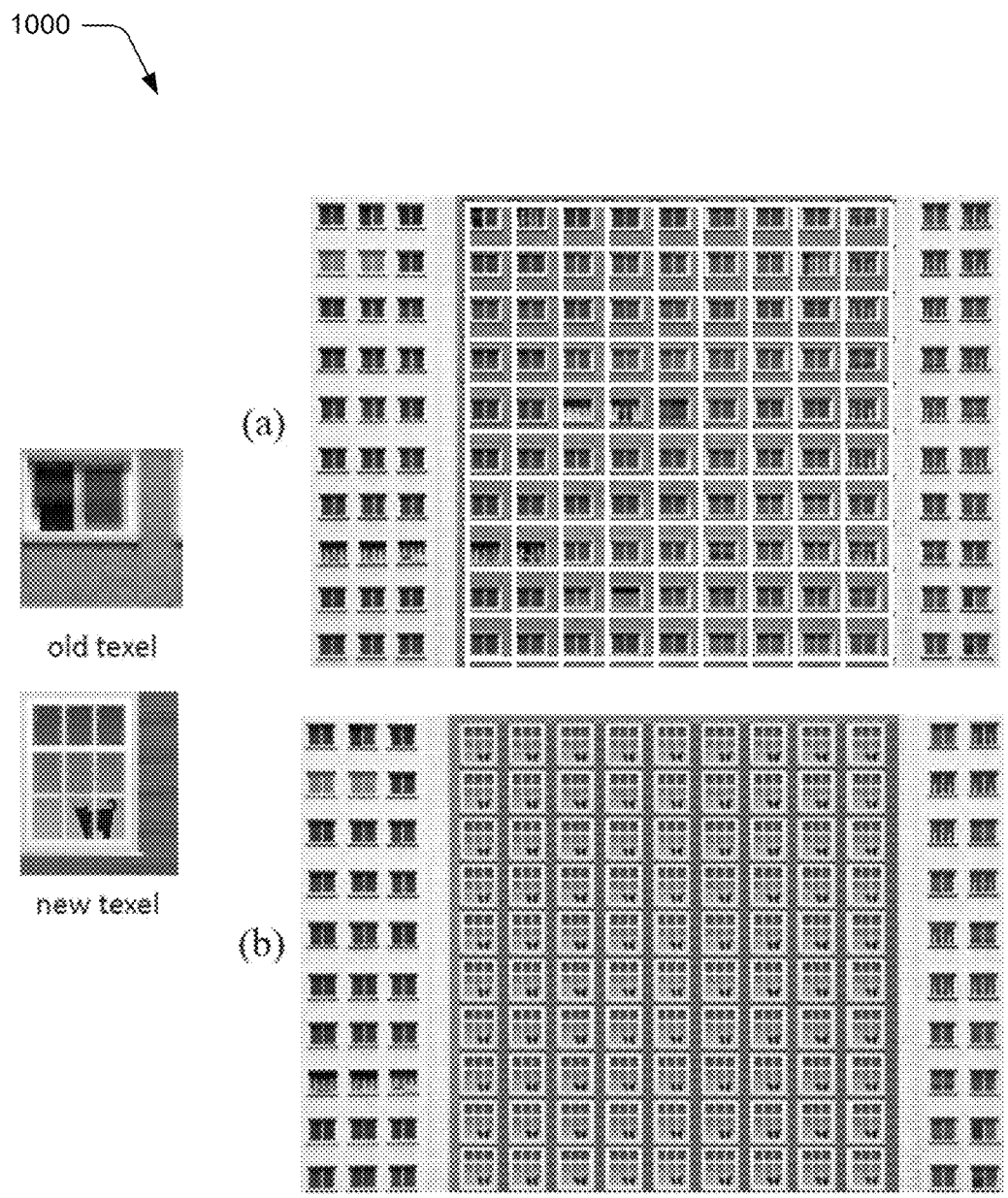
FIG. 10 depicts an example of texture editing.

One or more texture manipulation editing operations are performed at a texel level based on the generated model (block 1106). A variety of different operations may be performed, which may include replacement of one texel with another as shown in FIG. 10.

Figure 12:
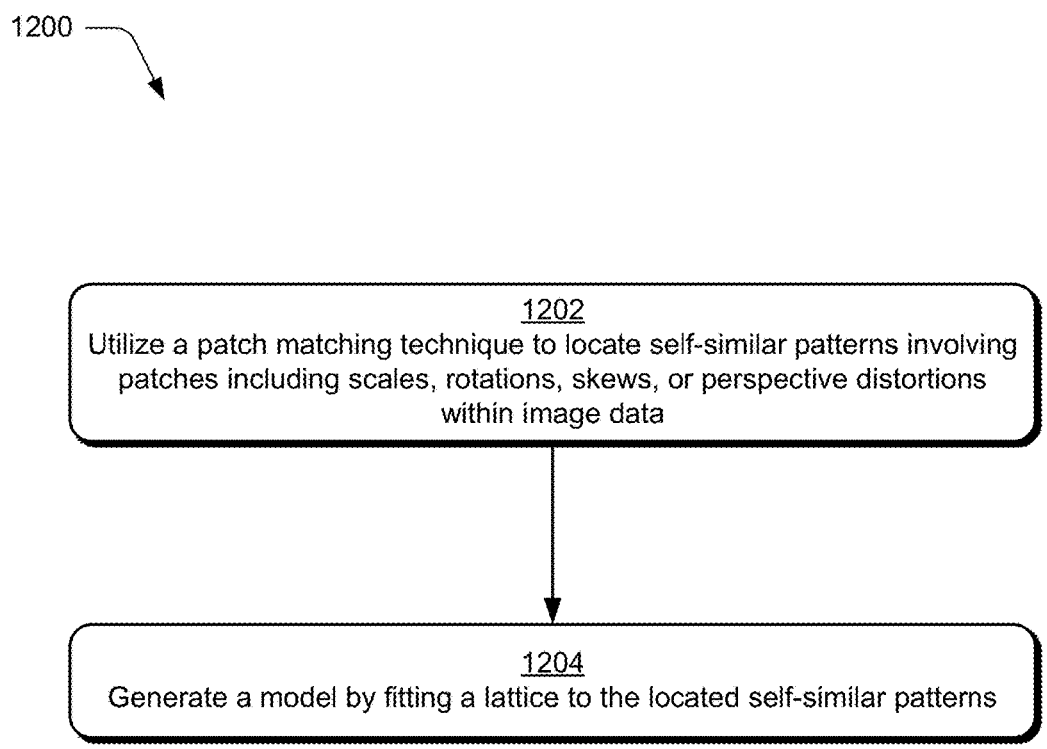
FIG. 12 is a flow diagram depicting a procedure in an example implementation in which patch matching techniques are leveraged to generate a model.

FIG. 12 depicts a procedure 1200 in an example implementation in which a patch match techniques is leveraged to generate a model. A patch matching technique is utilized to locate self-similar patterns involving patches including scales, rotations, skews, or perspective distortions within image data (block 1202). Thus, in this way, non-regular patterns of texture may be identified within the image data 108.

A model is generated by fitting a lattice to the located self-similar patterns (block 1204). Examples of such fitting are shown in FIGS. 8 and 9. Other examples are also contemplated without departing from the spirit and scope thereof.

Example System and Device

Figure 13:
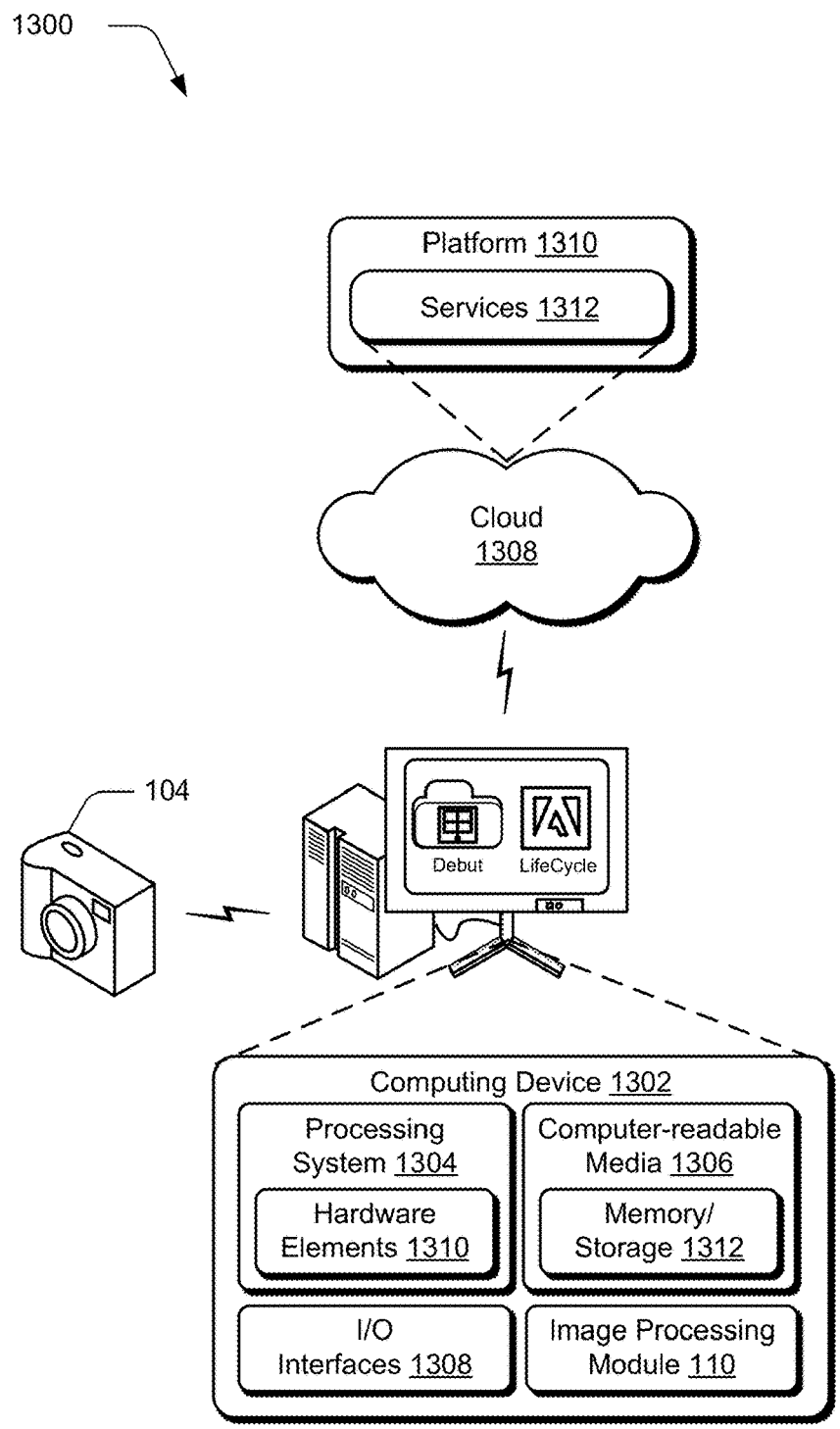
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein and thus may incorporate an image processing module 110 and image capture device 104 as described above. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device embodiment, implementation of functionality described herein may be distributed throughout the system 1300. For example, the functionality may be implemented in part on the computing device 1302 as well as via the platform 1322 that abstracts the functionality of the cloud 1320.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   discovering, by a computing device, self-similar patterns including a plurality of texels in image data, each of the texels representing an element that repeats for the plurality of textels to form a texture pattern in the image data;
   generating, by the computing device, a model that describes regularity of the plurality of the texels in the image data by estimating a homography between planes that include respective ones of the texels;
   receiving, by the computing device, an input identifying a new textel;
   replacing, by the computing device, each of the plurality of textels as specified by the regularity of the model in the image data with the new textel; and
   outputting, by the computing device, the image data having the new textel as repeated based on the model.

2. The method as described in claim 1, wherein the discovering is performed by using a patch matching technique.

3. The method as described in claim 2, wherein the patch matching technique includes finding a nearest neighbor field (NNF) for patches in the image data.

4. The method as described in claim 1, wherein the model defines translations and at least one other transformation of the plurality of texels in relation to each other.

5. The method as described in claim 4, wherein the at least one other transformation includes scaling, skewing, rotation, or perspective distortion.

6. The method as described in claim 1, wherein the generating of the model includes fitting a lattice based on the discovered texels to the image data.

7. The method as described in claim 6, wherein the fitting of the lattice includes representing translational symmetric patterns as a pair of translation vectors and voting to determine which of the translation vectors are to be used.

8. The method as described in claim 7, wherein the voting is based at least in part on a count of inlier points that are within a threshold of an integer position such that the pair of translation vectors having a corresponding highest inlier count in relation to other pairs of translation vectors is used as basis vectors for the fitting of the lattice.

9. The method as described in claim 1, further comprising performing one or more texture manipulation editing operations at a texel level based on the generated model.

10. The method as describe in claim 1, wherein the discovering is automatic.

11. A computing device comprising:
    a processing system; and
    non-transitory computer-readable storage media having instructions stored thereon that, responsive to execution by the processing system, causes the processing system to perform operations comprising:
      discovering self-similar patterns including a plurality of texels in image data, each of the texels representing an element that repeats for the plurality of textels to form a texture pattern in the image data;
      generating a model that describes regularity of the plurality of the texels in the image data by estimating a homography between planes that include respective ones of the texels;
      receiving an input identifying a new textel;
      replacing each of the plurality of textels as specified by the regularity of the model in the image data with the new textel; and
      outputting the image data having the new textel as repeated based on the model.

12. The computing device as described in claim 11, wherein the discovering is performed by using a patch matching technique.

13. The computing device as described in claim 12, wherein the patch matching technique includes finding a nearest neighbor field (NNF) for patches in the image data.

14. The computing device as described in claim 11, wherein the model defines translations and at least one other transformation of the plurality of texels in relation to each other.

15. The computing device as described in claim 14, wherein the at least one other transformation includes scaling, skewing, rotation, or perspective distortion.

16. The computing device as described in claim 11, wherein the generating of the model includes fitting a lattice based on the discovered texels to the image data.

17. The computing device as described in claim 16, wherein the fitting of the lattice includes representing translational symmetric patterns as a pair of translation vectors and voting to determine which of the translation vectors are to be used.

18. The computing device as described in claim 17, wherein the voting is based at least in part on a count of inlier points that are within a threshold of an integer position such that the pair of translation vectors having a corresponding highest inlier count in relation to other pairs of translation vectors is used as basis vectors for the fitting of the lattice.

19. The computing device as described in claim 11, wherein the discovering is automatic.

20. A system comprising:
    means for discovering self-similar patterns including a plurality of texels in image data, each of the texels representing an element that repeats for the plurality of textels to form a texture pattern in the image data;
    means for estimating a homography between planes that include respective ones of the texels;
    means for generating a model that describes regularity of the plurality of the texels in the image data;
    means for receiving an input identifying a new textel;

means for replacing each of the plurality of textels as specified by the regularity of the model in the image data with the new textel; and means for outputting the image data having the new textel as repeated based on the model.

\* \* \* \* \*